(12) United States Patent
Keller

(10) Patent No.: US 12,436,163 B2
(45) Date of Patent: Oct. 7, 2025

(54) LEAKAGE TEST

(71) Applicant: Roche Diagnostics Operations, Inc., Indianapolis, IN (US)

(72) Inventor: Reto Keller, Trachslau (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 448 days.

(21) Appl. No.: 18/053,510

(22) Filed: Nov. 8, 2022

(65) Prior Publication Data

US 2023/0168268 A1 Jun. 1, 2023

(30) Foreign Application Priority Data

Nov. 30, 2021 (EP) .................................. 21211392.2

(51) Int. Cl.
*G01N 35/10* (2006.01)
*B01L 3/02* (2006.01)

(52) U.S. Cl.
CPC ........ G01N 35/1097 (2013.01); B01L 3/0293 (2013.01); G01N 35/1016 (2013.01); *B01L 2400/0622* (2013.01); *G01N 2035/1025* (2013.01)

(58) Field of Classification Search
CPC ........... G01N 35/1097; G01N 35/1016; G01N 2035/1025; B01L 3/0293; B01L 2400/0622
USPC .................................................. 324/754.03
See application file for complete search history.

(56) References Cited

U.S. PATENT DOCUMENTS

| 5,365,783 A * | 11/1994 | Zweifel ................. G01F 23/268 324/663 |
| 11,441,978 B1 * | 9/2022 | Wiederin ........... G01N 35/1097 |
| 2005/0223814 A1 | 10/2005 | Shvets et al. |
| 2010/0051060 A1 * | 3/2010 | Kuroda .............. G01N 35/1004 134/166 C |
| 2010/0098590 A1 * | 4/2010 | Inamura ............. G01N 35/1016 324/663 |

(Continued)

FOREIGN PATENT DOCUMENTS

EP 1785731 A1 * 5/2007 ......... G01N 35/1009
WO 2020/066449 A1 4/2020

OTHER PUBLICATIONS

European Search Report issued May 9, 2022, in Application No. 21211392.2, 2 pp.

Primary Examiner — Alesa Allgood
Assistant Examiner — Rahul Maini
(74) Attorney, Agent, or Firm — Woodard, Emhardt, Henry, Reeves & Wagner, LLP

(57) ABSTRACT

An automated method for performing a leakage test of a fluidic system of an in-vitro diagnostic device as well as an automated in-vitro diagnostic device comprising a controller configured to perform the leakage test. The method comprises activating a pump to provide a fluid from a fluid supply into an electrically conductive probe. The probe is positioned so that a tip of the probe is at a predetermined distance from a reference surface of a reference element. In case of leakage, an electrical signal or change in an electrical signal or a change of the electric or magnetic field between the probe and the reference element is detected in a predetermined measuring time period and at least one maintenance action is triggered.

16 Claims, 8 Drawing Sheets

(56) References Cited

U.S. PATENT DOCUMENTS

| | | | |
|---|---|---|---|
| 2014/0010667 A1* | 1/2014 | Trump | G01N 35/1016 417/43 |
| 2018/0340916 A1* | 11/2018 | Song | G01N 30/32 |
| 2024/0142477 A1* | 5/2024 | Oguro | G01N 35/1004 |

* cited by examiner

LEAKAGE TEST

CROSS-REFERENCE TO RELATED APPLICATIONS

This application claims priority to European Patent Application No. 21211392.2, filed 30 Nov. 2021, the disclosure of which is hereby incorporated by reference in its entirety.

TECHNICAL FIELD

The present disclosure relates to an automated method for performing a leakage test in a fluidic system of an in-vitro diagnostic device and to an automated in-vitro diagnostic device comprising a controller configured to perform the leakage test.

BACKGROUND

Automated in-vitro diagnostic (IVD) devices rely on precise and accurate pipetting in order to ensure reliable analytical results. Typically, the fluidic system of an IVD device contains an arrangement of one or more probes, dosing pumps, fluidic conduits, valves, etc., that enable the device to aspirate and/or dispense fluids or to transport fluids from one place in the device to another, e.g., from a fluid supply to a probe, where the fluid can be dispensed into, e.g., a reaction vessel. Fluids that are typically processed by an IVD device or that are required to ensure proper functioning of the IVD device include liquid samples, reagents, buffer solutions, cleaning solutions, system fluids, etc.

It may however occur, that one or more components of the fluidic system are leaking, e.g., due to deterioration, incorrect installation or manufacturing defects. A leakage can have multiple effects: It can lead to imprecise and inaccurate aspiration or dispensation of fluids, which reduces the reliability of the analytical result. It can also lead to cross-contamination between patient samples, e.g., when the leakage causes the formation and detachment of drops at the tip of the probe. If in such a case the probe is moved from a first sample container over a second sample container, a drop might detach from the probe and cross-contaminate the sample in the second sample container, again leading to unreliable analytical results. Further, a leaking fluidic system my cause contamination of the IVD device itself, e.g., with sample material, reagent or liquid system fluid. In particular, fluids may drop from the probe tip while the probe is moved within the device and they may also drop from, e.g., valves or fluidic conduits, thereby contaminating inner parts of the device. These positions may be difficult to reach, posing an additional inconvenience for the device operator, because decontamination procedures often need to be conducted manually. This additionally leads to longer down-times of the IVD device, because the IVD device is usually switched off during such decontamination procedures to prevent injuries to the device operator.

It is therefore crucial to detect a leakage in the fluidic system as early as possible in order to take the necessary corrective measures in due time, thereby preventing erroneous analytical results and reducing the operational burden on the device operator.

Different approaches have been proposed in the past to automatically check the integrity of the fluidic system of an IVD device. Known are methods in which pressure sensors are provided to certain parts of the fluidic system, where a change in pressure, in particular a decrease of pressure, may be correlated to the presence of leakage. However, adding additional parts to the IVD device increases complexity and cost of the device. In another approach, e.g., WO 2020/066449 A1, a method is disclosed for detecting an abnormality in a fluidic conduit by using a liquid level sensor in a fluid supply. The method however has a low sensitivity, since it relies on a back flow of fluid from the fluidic conduit into the fluid supply. Depending on the size of the fluid supply, small changes of fluid volume may not be registered, thus small leakages are unlikely to be detected. On the other hand, it may take a long time until an adequate amount of fluid has flown back into the fluid supply for the liquid level sensor to detect a rise of the fluid surface. In addition, the method relies on having a liquid level sensor installed in the fluid supply, thereby increasing cost and complexity of the device.

It is against the above background that aspects of the present disclosure provide certain unobvious advantages and advancements over the prior art. In particular, a need was recognized for improvements of a leakage test in a fluidic system of an in-vitro diagnostic (IVD) device.

SUMMARY

Although the aspects of the present disclosure are not limited to specific advantages or functionality, it is noted that the present disclosure allows for an automated method of performing a leakage test in a fluidic system of an IVD device and triggering at least one maintenance action in order to ensure precise and accurate pipetting and ultimately reliable analytical results.

Another advantage of the method is that it is highly reliable and provides a broad detection range and a high sensitivity to leakage, i.e., it enables to detect larger leakages from above 1 mL/sec to smaller leakages of below 10 µL/sec. Additionally, the method allows to detect a leakage in a shorter time compared to proposed prior art solutions.

Another advantage according to certain aspects is that it enables leakage detection by making use of a liquid level detection functionality of a pipetting device, i.e., without the need to add any additional components or functional units and consequently without adding complexity to the device.

Another advantage of the method according to certain aspects is that it can provide an indication to the device operator, which component of the fluidic system is leaking. This supports the device operator in locating the leakage and taking respective measures to correct the deficiency.

In accordance with one embodiment of the present disclosure, an automated method of performing a leakage test of a fluidic system of an in-vitro diagnostic device is provided comprising an electrically conductive probe fluidically connected to a fluid supply via a fluidic conduit and interacting electrically with a reference element, the method comprising: activating a pump to provide a fluid from the fluid supply into the probe; deactivating the pump; positioning the probe so that a tip of the probe is at a predetermined distance from a reference surface of the reference element; and upon detecting an electrical signal or a change in an electrical signal between the probe and the reference element in a predetermined measuring time period, determining a leakage and triggering at least one maintenance action.

In accordance with another embodiment of the present disclosure, an in-vitro diagnostic device is provided, comprising: a fluidic system, comprising: a fluid supply; a pump; an electrically conductive probe fluidically connected to the fluid supply via a fluidic conduit, and interacting electrically with a reference element; and a controller configured to control the device to perform a leakage test of the fluidic system according to a method of the present disclosure.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
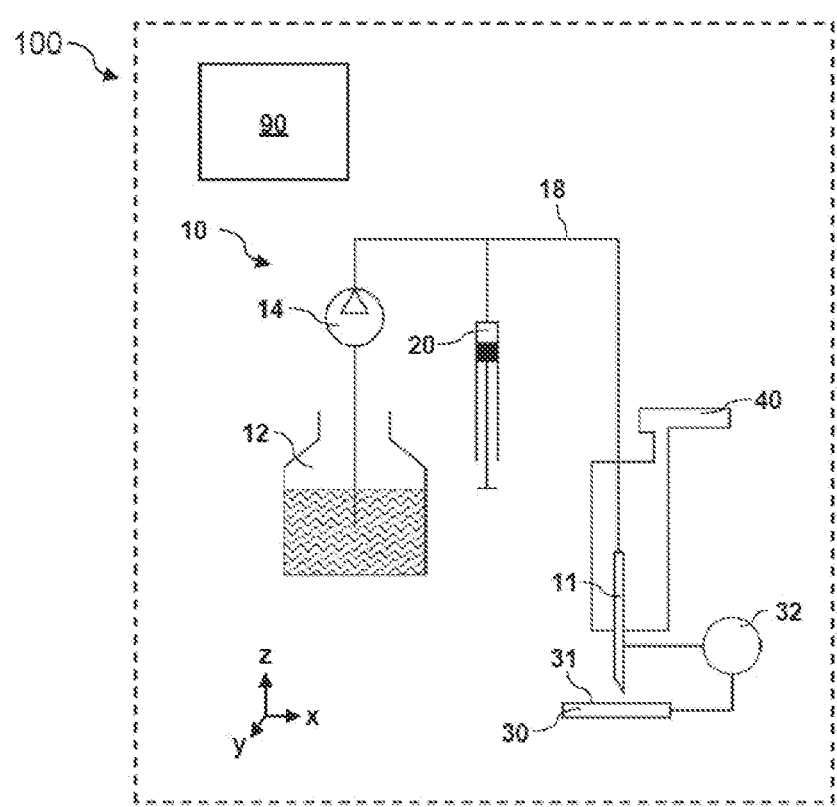
FIG. 1 shows a schematic illustration of an in-vitro diagnostic (IVD) device comprising a fluidic system and a controller according to an aspect of the present disclosure.

Skilled artisans appreciate that elements in the figures are illustrated schematically for simplicity and clarity and have not necessarily been drawn to scale. For example, the dimensions of some of the elements in the figures may be exaggerated relative to other elements to help improve understanding of the aspects of the present disclosure. Also, parts have been omitted that do not contribute to the teaching of this disclosure.

DETAILED DESCRIPTION

The term "in-vitro diagnostic device" or "IVD device" as used herein refers to any kind of automated analytical apparatus, pre-analytical apparatus, post-analytical apparatus or combinations thereof. An analytical apparatus is configured to obtain an analytical measurement value from a patient's sample in vitro in order to provide information on the health status of the patient. The analytical measurement values can be qualitative and/or quantitative measures of analytes. It is designed to automatically conduct a set of processing steps optimized for the respective type of analysis, e.g., coagulation analysis, hematology analysis, clinical chemistry, immunochemistry, and can include processing steps such as pipetting, incubating, transporting, mixing, heating, cooling, measuring, detecting, cleaning, etc. A pre-analytical apparatus is configured to prepare the samples or the sample containers holding the samples in a way that they can be processed by an analytical apparatus afterwards. This can include processing steps such as loading/unloading of liquid containers and/or consumables, decapping, preliminary checks of the sample quality, fill-level checks, pipetting, aliquoting, centrifuging, labelling, sorting, incubating, and the like. A post-analytical apparatus on the other hand is configured to process samples after they have been analyzed, including, e.g., transferring samples to storage vessels, capping, labelling, fixing, archiving/storing, discarding. An IVD device can be operated as stand-alone device or in conjunction with one or more other in-vitro diagnostic devices. An IVD device typically comprises a plurality of functional units, each dedicated to a specific task and cooperating with each other in order to enable automated sample processing and analysis. Such functional units may be a pipetting unit, a pump, a valve, a conveyor, a gripper, an incubation unit, an analytical measurement unit, a temperature regulating unit, a controller, etc.

A "fluidic system" as referred to in the present disclosure is an arrangement of operatively connected functional units and/or components in an IVD device that enable or contribute to fluid handling, such components including for example any one or more of a fluid storage, a bubble trap and/or degasser, a pipetting unit, an evacuation unit, an evaporation unit, an incubation unit, a fluidic conduit, a pump, a valve, a sensor, e.g., a pressure sensor, etc. The particular arrangement depends on the setup and the function of a given IVD device or a given functional unit.

The term "fluid" as used herein is a generic term to indicate any type of liquid material that is processed in an IVD device. It can refer to a liquid that is sought to be analyzed, e.g., a sample. A sample can be any biological material suspected of containing one or more analytes or having physical or chemical characteristics, the detection of which—qualitative and/or quantitative—may be associated to a medical condition. It can be derived from any biological source, such as a physiological fluid, including, blood, saliva, sputum, ocular lens fluid, cerebral spinal fluid (CSF), sweat, urine, milk, ascites fluid, mucous, synovial fluid, peritoneal fluid, pleural fluid, amniotic fluid, tissue, bone marrow, feces, cells or the like. The term "fluid" can further refer to liquids that are required to react with or support the reaction with an analyte in a sample, e.g., a reagent or a buffer solution. It can refer to liquids that contain known levels of analytes and are used to check or confirm the IVD device's operability, e.g. a QC sample, a calibrator or a reference solution. According to an aspect of the present disclosure, the term fluid can further refer to liquids that are used to bring or maintain the IVD analyzer in an operating mode, e.g., a wash solution or a system fluid. It is common to operate an IVD device using a liquid system fluid, e.g., water, as a hydraulic pressure transmission liquid. The fluidic system may however at least in part comprise gaseous inclusions, e.g., air bubbles between the liquid system fluid and a sample to separate and avoid contamination between the two liquids. The term "fluid" may therefore also refer to gaseous inclusions in an otherwise liquid fluid, e.g., ambient air, pressurized air, nitrogen or the like.

A "fluid supply" as referred to in the present disclosure can be any kind of container or reservoir that is designed to hold a certain type of fluid and that is configured to make the fluid accessible to the IVD device. The fluid supply may be an external fluid source, i.e., a separate unit outside of the IVD device but in fluidic connection therewith, e.g., a water supply in a laboratory. The fluid supply may further be a liquid container that is installed in the IVD device or that is temporarily provided to the IVD device, e.g., a sample container, reagent container or bulk liquid container.

A "pump" as referred to in the present disclosure is any kind of functional unit that enables movement of a fluid in a confined space (e.g., in a fluidic conduit), possibly by creating a negative or positive pressure in that confined space. Depending on the application and the fluid volume that needs to be moved different types of pumps can be used, e.g., piston, plunger, syringe, displacement or micro-gearwheel pump. The term "activating a pump" refers to switching the pump from a non-pumping mode to a pumping mode in which the pump pumps liquid. The non-pumping mode on the other hand is a mode in which the pump does not pump liquid. The opposite process, i.e., switching the pump from a pumping mode to a non-pumping mode, is referred to as "deactivating" the pump. Since pumps are well known in the state of the art and widely used, especially in the field of IVD devices, their functional principle will not be described in further detail in this disclosure.

A "fluidic conduit" as referred to in the present disclosure is any element with an inner hollow channel through which a fluid can be moved, typically an elongated element like a tube, pipe, duct etc. The conduit may contain gaseous and liquid fluid at the same time, e.g., a system fluid and air gap(s) that prevent aspirated liquid from mixing with the system fluid. Typically, a fluidic conduit provides a fluidic connection between two or more functional units or components in an IVD device to enable the transport of fluids between them, e.g., between a probe and a pump, between a fluid supply and a pump or between a pump and a valve. The conduit can be made of any material, e.g., a flexible material, like silicone, etc., or a rigid material, like metal or glass etc., ideally with inert properties towards the fluid being moved inside in order to prevent interaction with or contamination of the fluid.

A "probe" as referred to in the present disclosure is a functional element configured to perform pipetting operations, i.e., aspirating and/or dispensing of fluids. Typically, the probe has an elongated, tubular and/or tapered shape with at least one opening at or near a tip of the probe that leads to a hollow inner channel. The hollow inner channel leads through the probe and emerges at an opposite end of the probe, where it is fluidically connected to a pump via a fluidic conduit. The pump allows for creating a negative or positive pressure inside the channel so that fluids can be aspirated or dispensed through the tip of the probe. For example, the probe can be designed as a needle with a blunt or with a sharpened tip to facilitate penetration through a lid of a closed liquid container from where it can aspirate a volume of liquid. Further, the probe may be fluidically connected from its opposite end to a fluid supply. According to an aspect of the present disclosure, the method comprises activating a pump to provide a fluid, e.g., a buffer solution, a wash solution or a system fluid, from a fluid supply into the probe. For example, in order to rinse and clean the inner channel of the probe and thus prevent cross-contamination, a wash solution may be pumped from a wash solution supply via a conduit to the probe and into the channel of the probe. As long as the pump is activated, i.e., delivers wash solution from the respective fluid supply, the fluidic conduits between fluid supply, pump and probe are filled with a constant stream of wash solution, where the excess of wash solution is discarded via the tip of the probe. To end the wash processing step, the delivery of wash solution is stopped by deactivating the respective pump. The wash solution remaining in the fluidic conduit(s), the valve(s) and in the probe(s) may then be flushed out by replacing it with another fluid, e.g., a system fluid that is provided by a respective pump from a system fluid supply. The system fluid may then be used as hydraulic pressure transmission liquid during subsequent pipetting operations. In another aspect of the invention, the system fluid and the wash solution may be the same fluid, e.g., water or a solution comprising one or a plurality of compounds, like a detergent or a preservative, etc. In that case, the flushing step would not be required. The probe may be designed as multi-use probe that requires to be cleaned regularly in order to prevent cross-contamination or it may be designed as single-use probe that is exchanged between different pipetting procedures. Typically, the probe is oriented so that the tip of the probe is below the opposite end of the probe. The longitudinal orientation of the probe may be in a vertical direction or it may be at an angle to a vertical axis.

A "valve" as referred to in the present disclosure can be any kind of functional unit for directing, regulating or controlling fluids in a fluidic system by opening, closing or partially obstructing passages. Examples of commonly used valves are solenoid valves, isolation valves, proportional valves, rotary valves, etc. Since such elements are well known in the state of the art and are widely used, they will not be described in further detail in this disclosure.

It may occur that one or more components of the fluidic system are leaking. There can be many reasons for leakage, e.g., deterioration, incorrect installation, manufacturing inaccuracies or unintentional damages caused, e.g., by device operators. Leakage occurs when fluids escape or enter the fluidic system unintentionally. In this case, the pressure inside the fluidic system cannot be kept constant or cannot be controlled any longer, which then can lead to imprecise and inaccurate pipetting or to cross-contamination. The term "leakage test" refers to a method or measure conducted in order to detect a leak in a fluidic system. According to an aspect of the present disclosure, a leakage test can be performed at certain time intervals, where the time intervals may be predefined or where they may depend on certain trigger events, e.g., out-of-specification QC measurements or calibration results.

"Electrical conductivity" as used in the present disclosure refers to a material's ability to conduct an electric current, which depends on the availability and density of mobile charge carriers. For example, materials may be considered electrically conductive if they present a permittivity of >20 µS/cm. Materials for certain components of an IVD device may be selected based on their electrically conductive properties so that an electrical signal can be applied to them. For example, when referring to an "electrically conductive probe", the probe may at least in part be made of an electrically conductive material such as a metallic material like stainless steel, a conductive plastic material or the like. This allows using the probe not only to aspirate and/or dispense fluids, but also to detect contact with a liquid. For example, in order to minimize the risk of cross-contamination and facilitate probe cleaning, it can be desirable to position the tip of the probe just below the liquid surface of, e.g., a liquid sample. To ensure reliable probe positioning it is therefore advantageous to detect when the probe reaches the surface of the liquid. In another example and according to an aspect of the present disclosure, the technical principle to detect contact with a liquid may also be used to detect a leakage in the fluidic system.

With respect to the leakage test, the electrically conductive probe or part of the probe acts as an electrode that interacts with a reference electrode of a reference element. The reference element thereby comprises the reference electrode and a reference surface. The reference electrode represents an opposite electrode to the probe and is typically made of an electrically conductive material, e.g., a metallic material, like stainless steel, or a conductive plastic material, or the like. The probe and the reference element are interacting electrically, which may refer to an arrangement that enables the direct exchange of charge carriers between the probe and the reference element, but may also refer to an arrangement that allows the application of an electrical potential difference in-between, e.g., of a voltage, of a current, of an electric or magnetic field. The probe may be a measuring electrode and the reference electrode of the reference element may be a ground electrode or vice versa. The reference element may further be positioned at a convenient position in reach of the probe within a certain distance so that an electrical interaction can be established between the probe and the reference element. The reference surface of the reference element may be positioned between the probe and the reference electrode of the reference element. For example, the reference surface may be the surface of the reference electrode directed towards the probe and may therefore have the same characteristics as the reference electrode in regard of electrical conductivity. In another example, the reference surface may be a coated layer, not necessarily electrically conductive, on the reference electrode. In yet another example, the reference surface may be a surface of a component separated from and in proximity of the reference electrode of the reference element, where the component and its surface may have or may not have electrically conductive characteristics. For example, the reference surface may be the surface of a component made of metal or plastic or it may be a liquid surface of a liquid in a liquid container positioned between the probe and the reference electrode. The reference surface may have a permittivity and/or magnetic permeability different from the surrounding air between the reference surface and the probe. The reference element may be a separate element installed in the IVD device explicitly for performing the leakage test. Alternatively, the reference element may be integrated into another element, e.g., into a liquid container, a liquid container holder, a probe, a teaching reference element for calibrating moving components in the IVD device, etc. It may have any shape, e.g., a plate-like planar shape, a cubic shape, a cylindrical shape, a spherical shape. According to an aspect of the disclosure, the probe is positioned so that the tip of the probe is at a predetermined distance from the reference surface of the reference element, typically comprised between 0.01 mm and 5 mm, e.g., between 0.1 mm and 2 mm, or between 0.5 mm and 1.5 mm. According to an aspect of the present disclosure, the reference element is an element with a horizontally planar reference surface. For the leakage test, the probe is positioned above the reference surface at a predetermined distance so that the reference surface comes to lie below the probe, e.g., in a vertical direction below the tip of the probe. This can be achieved by moving either the probe to the adequate position above the reference surface of the reference element, or by moving the reference surface of the reference element to the adequate position below the probe or by moving both the probe and the reference surface of the reference element relative to each other. A drop of liquid formed at the tip of the probe would—due to gravitational force—extend in the direction of and possibly come in contact with the horizontally planar reference surface.

There are different methods for detecting the presence of a liquid or changes in liquid levels that are based on the measurement of electrical signals or changes in electrical signals, which are known in the art. For example, in a capacitive detection method, the two electrically conductive electrodes form a capacitor. A fluid between the two electrodes acts as the dielectric medium, which will affect the capacitance created between the two electrodes. Changes in capacitance can be measured by applying an alternating voltage (AC voltage) and alternating current or a direct current voltage (DC voltage) and a direct current between the two electrodes. Another example of a detection method is a resistive or conductive detection method. Analogous to the capacitive detection method, the probe and reference element act as pair of electrodes. Again, an AC voltage and alternating current or DC voltage and direct current are applied. As soon as there is a liquid between the electrodes, it forms a part of an electric circuit, causing current to flow. Electrical resistance or conductivity is measured and compared to a preset value in order to determine presence of liquid. Yet another example to detect the presence of liquid between the two electrodes is to measure changes in inductance. The above mentioned detection methods represent a non-exhaustive selection of possible forms of implementation and may be applied individually or in combination. In any case, the probe contacting a liquid typically leads to a detectable change of an electrical signal. The electrical signal may have to be amplified first by a signal processing unit. The above mentioned detection methods may further be combined with methods intended for liquid level surveillance that are based on other technical principles, e.g., float sensors, infrared sensors, optical level switches, and the like.

The term "electrical signal" as used in the present disclosure refers to any kind of electrical parameter or measure. It may, e.g., refer to voltage, current, electrical resistance, conductivity, capacitance or impedance or any derivatives thereof over time. It may also refer to an electric field or a magnetic field or a combination of both that is generated, e.g., between two electrodes or to the change of the electric or magnetic field's force. The value of the electrical signal can thereby comprise an AC or DC value, peak value, frequency, phase shift angle, duty cycle, electric field strength, magnetic field strength or the like.

According to an aspect of the present disclosure an electrical signal is measured or monitored for a predetermined measuring time period. The predetermined measuring time period is a time period that defines the maximal duration of an electrical signal check/monitoring step. It typically comprises a time period lower than 10 minutes, e.g., maximally 5 minutes, or maximally 1 minute. According to an aspect of the disclosure, when an electrical signal or a change in an electrical signal is detected in the predetermined measuring time period, a leakage is determined and at least one maintenance action is triggered. In such an event, the measuring time period ends at the time point of signal detection or signal change detection or when the electrical signal has reached a predetermined threshold value. With other words, the measuring time period ends either when an electrical signal or a change in an electrical signal is detected or when the end of the predetermined measuring time period is reached, whatever occurs first. As mentioned above, the change in the electrical signal may thereby be any of a change in capacitance, resistance, voltage, frequency, inductance, current, and the like and is typically measured by a measurement unit, e.g., a capacitance measuring unit. The measurement unit may be configured to detect an electrical signal or change in electrical signal and/or may be configured to apply an electric potential difference, thereby acting as, e.g., voltage source or current source. The measurement unit may therefore include a voltage source, a current source, an electric (sensing) circuitry, a signal generator, an oscillator, etc.

According to an aspect of the automated method, the probe is moved to a position so that the tip of the probe is at a predetermined distance from the reference surface of the reference element. An electric potential difference is applied between the probe and the reference element and the predetermined measuring time period starts. The electrical signal that is measured between the probe and the reference element in the initial phase of the measuring time period is referred to as electrical baseline signal. The electrical baseline signal may have a constant value or a constant slope. In case of leakage, the pressure inside the fluidic system can no longer be maintained, which results in the formation of a drop of fluid, e.g., of system fluid, at the tip of the probe. The rate of drop formation depends on the severity of the leakage. Once the drop has reached a size to come in contact with the reference surface, it causes a change in electrical signal from the electrical baseline signal across a signal threshold, which is detected and confirms the presence of a leakage in the fluidic system.

According to certain aspects of the present disclosure, a "maintenance action" that is triggered upon detection of an electrical signal or a change in an electrical signal may be a fully automated processing step that can be conducted by the IVD device without manual intervention by an operator, e.g., a calibration, a purge of the fluidic system, flagging of analytical results, repetition of a leakage test and the like. In another example, a maintenance action may be visual or acoustic or audio-visual presentation to an operator of the IVD device, indicating that a manual maintenance action is required, possibly indicating the type of maintenance action that is required and possibly instructing the operator on how to conduct the maintenance action, possibly including guiding the operator during execution of the maintenance action. A manual maintenance action may be, e.g., a probe replacement, visual check of the fluidic system or components thereof, tightening or replacement of valves or fluidic conduits, probes, etc., the instruction to contact a service technician or the like.

According to an aspect of the present disclosure, the method comprises having a valve that controls fluid passage between the pump and the probe in a closed state for the measuring time period. The valve is thereby in fluidic connection with the fluid supply and with the probe via fluidic conduits and is typically located downstream of the pump. A valve is in a closed state in the sense of the present disclosure when it is switched or positioned in a way so that fluid passage is blocked, i.e., that no fluid can pass by the valve, when the valve is working properly. The valve may be switched to a closed state once the fluid that has been provided from the fluid supply to the probe has arrived to the tip of the probe, at latest however at the start of the measuring time period. Consequently, at the time point when the measuring time period starts, the fluidic system is in a state in which the fluidic conduit(s) connecting the fluid supply with the probe and the probe itself have been supplied with the respective fluid and the valve is in a closed state. The valve is kept in a closed state for the entire duration of the measuring time period. When the measuring time period ends, i.e., when an electrical signal or a change in electrical signal is detected or when the predetermined measuring time period reaches its end, the valve may be switched to an open state or may remain in the closed state.

According to another aspect of the present disclosure, the method comprises activating the pump during the measuring time period. The term "during" thereby refers to any time point within the measuring time period, particularly to a predetermined time point within the measuring time period. For example, the pump can be activated at the start of the measuring time period so that the pump is in a pumping mode for the entire duration of the measuring time period, i.e., until the end of the predetermined measuring time period is reached or until an electrical signal or change in electrical signal is detected between the probe and the reference element, whatever event occurs first. In another example, the pump can be activated at a predetermined time point within the predetermined measuring time period, e.g., after half of the predetermined measuring time period has elapsed or after two-thirds of the predetermined measuring time period have elapsed or after 20 seconds of the predetermined measuring time period have elapsed, etc., so that the pump is in a non-pumping mode for a part of the measuring time period and in a pumping mode for another part of the measuring time period. With other words, the pump is in a non-pumping mode when the predetermined measuring time period starts and is activated at the given time point, if up to that time point no electric signal or change in electrical signal has been detected between the probe and the reference element that would have ended the measuring time period. Activating the pump when performing the leakage test leads to a pressure increase in the fluidic conduit and/or on the closed valve located downstream of the pump. A possible leak, in particular a valve leak, may be better detectable when exposed to a higher pressure. The pressure that the pump needs to create depends on the design of the IVD device, in particular on the placement of the different functional units and/or components of the fluidic system in relation to each other. For example, the fluid supply, the valve and at least parts of the fluidic conduit may be installed at a position vertically lower than the probe. Thus, the pump may be required to create a pressure high enough to counteract gravitational force or atmospheric pressure. In another example, the fluid supply, the valve and at least parts of the fluidic conduit may be installed at a position vertically above the probe. In consequence, the pump may not be required to be activated for the leakage test, since a potential leakage may be determined based on the gravitational force acting on the fluid in the fluidic system. For the leakage test, the pump may be operated to create a pressure higher than the pressure required during routine operation, allowing to perform the leakage test in a shorter time and/or to detect leakage at an early time point, i.e., before it affects the reliability of measurement results.

According to another aspect of the present disclosure, the method comprises switching a valve that controls fluid passage between the pump and the probe to an open state during the measuring time period. Opposed to the closed state that is described above, the valve is in an open state when it is switched or positioned in a way that enables fluid passage. The term "during the measuring time period" as used in this disclosure refers to any time point within the measuring time period, particularly at a predetermined time point within the measuring time period. That can be, e.g., at the start of the predetermined measuring time period so that the valve is in an open state for the entire measuring time period. Or it can be switched to the open state at a given time point within the predetermined measuring time period, e.g., after a third of the predetermined measuring time period has elapsed or after half of the predetermined measuring time period has elapsed or after 20 seconds of the predetermined measuring time period have elapsed, etc., so that the valve is in a closed state for a part of the measuring time period and in an open state for another part of the measuring time period.

The leakage test as disclosed may provide an indication of the location of a leak within the fluidic system. This is achieved by the way the functional elements of the fluidic system are operated during the leakage test. For example, if the valve that controls fluid passage between the fluid supply and the probe is in a closed state and the pump is deactivated for the measuring time period, a leak that is detected with the leakage test is likely to have occurred in the fluidic conduit between the valve and the probe. In another example, if the valve is in a closed state and the pump is in a pumping mode for (a part of) the measuring time period, a leak that is then detected is likely to have occurred in the valve. In yet another example, where the valve and the pump are positioned vertically above the level of the tip of the probe and where the pump is tightly sealed to the surrounding environment when in an non-pumping mode, the pump is deactivated for the measuring time period and the valve is in a closed state for a part of the measuring time period and in an open state for another part of the measuring time period. In that case, leakage detected in the part of the measuring time period with a closed valve may indicate a leakage in the fluidic conduit between the valve and the probe. Whereas leakage detected in the part of the measuring time period with an open valve may indicate a leakage in the fluidic conduit between the pump and the valve. Depending on the location of the leakage, a respective maintenance action may be triggered.

According to certain aspects of the present disclosure, the at least one maintenance action is selected from a set of possible conduit maintenance actions. A conduit maintenance action may refer to a corresponding automatic maintenance step, e.g., a calibration, a purge of the fluidic system, a repetition of the leakage test, etc. In addition or alternatively, a conduit maintenance action may refer to a corresponding manual maintenance action. Therefore, an instruction may be presented to the operator of the IVD device containing the information that the fluidic conduit is leaking and that manual maintenance is required. Manual maintenance steps may be any or combinations of checking and confirming the position of the leak, exchanging the affected conduit, readjusting or tightening the conduit, manually initiating a repetition of the leakage test, contacting a service technician to resolve the issue, etc.

According to certain aspects of the present disclosure, the at least one maintenance action is selected from a set of possible conduit and/or valve maintenance actions. A valve maintenance action may refer to a corresponding automatic maintenance step, e.g., a calibration, a purge of the fluidic system, a switching of the valve, a reset of the valve, a reset of the IVD device, a repetition of the leakage test, etc. In addition or alternatively, a valve maintenance action may refer to a corresponding manual maintenance action. A corresponding instruction may be presented to the operator of the IVD device containing the information that the valve is leaking and that manual maintenance is required. Manual maintenance steps may be any or combinations of checking and confirming the position of the leakage, exchanging the valve, exchanging parts of the valve, readjusting or tightening the valve, manually initiating a repetition of the leakage test, contacting a service technician to resolve the issue, etc. With reference to the example mentioned above, where the valve is in a closed state for the measuring time period and the pump is in a non-pumping mode for a part of the measuring time period and in a pumping mode for another part of the measuring time period, a leakage detected while the pump is in a non-pumping mode indicates a leak in the fluidic conduit. A corresponding conduit maintenance action is triggered. Whereas a leakage detected while the pump is in a pumping mode indicates a leak in the valve. A corresponding valve maintenance action is triggered. It may occur that leakage is detected at the time point of or shortly after activating the pump or switching the valve from a closed to an open state. In this case, indicating the location of the leak may be uncertain. Therefore, both a conduit and a valve maintenance action may be triggered.

According to certain aspects of the present disclosure, the at least one maintenance action is determined based on a time until detection, where the time until detection is the time measured from start of the predetermined measuring time period until the electrical signal or a change in the electrical signal is detected. The predetermined measuring time period therefore comprises the time until detection. Based on the length of the time until detection, certain characteristics of the leak can be deduced. For example, the length of the time until detection may correlate with the size of the leak, i.e., the shorter the time until detection, the bigger the leak. To determine the adequate maintenance action, one or more thresholds may be determined. For example, if the time until detection ends before a first threshold, the leak may be considered substantial or of high risk for generating unreliable analytical results and therefore requiring urgent maintenance actions. Corresponding automatic maintenance actions for correcting the deficiency may be an automatic notification to the service technician, the prevention of further analytical measurements, and the like. Corresponding manual maintenance actions may be exchanging the affected conduit, readjusting the conduit, exchanging the valve, exchanging parts of the valve, readjusting or tightening the valve, and the like. In another example, if the detection period ends between the first threshold and a second threshold, the leak may be considered moderate or of low risk for generating unreliable analytical results and therefore requiring routine maintenance actions. Corresponding maintenance actions may be a calibration, a purge of the fluidic system, a switching of the valve, a reset of the valve, a reset of the IVD device, a calibration of the pump, a repetition of the leakage test, or the like.

According to certain aspects of the present disclosure, triggering the at least one maintenance action comprises generating an alert indicating the at least one maintenance action. An alert may refer to any kind of visual or acoustic or audio-visual presentation to an operator of the IVD device, indicating that at least one automatic maintenance action is about to be performed and/or a manual maintenance action is required, possibly indicating the location of the leak or requesting the operator to confirm the proposed maintenance action or instructing how to conduct the manual maintenance action. An alert may be a light signal, e.g., a light of a certain wavelength or a flashing light. An alert may be an acoustic signal to attract the operator's attention, e.g., a siren. An alert may further be a visual information displayed to the operator on a display, possibly containing more detailed instructions on how a manual maintenance action needs to be conducted in order to resolve the leakage. An alert may also refer to any combinations of the above mentioned examples. Independent of the underlying technical method of the alert, it may be configured to not only indicate that a maintenance action has been triggered, but also to convey information on the type of maintenance action. For example, a certain wavelength may correspond to a certain maintenance action or a certain acoustic pattern may correspond to a certain maintenance action.

The present disclosure further relates to an IVD device comprising a fluidic system and a controller. The fluidic system comprises a fluid supply, a pump, an electrically conductive probe that is fluidically connected to the fluid supply via a fluidic conduit and interacting electrically with a reference element. The controller is configured to control the IVD device to perform a leakage test of the fluidic system according to the automated method described above.

The term "controller" as used in the present disclosure refers to a programmable logic controller or processor running a computer-readable program provided with instructions to perform operations in accordance with an operation plan. The term can mean central processing units, microprocessors, microcontrollers, reduced instruction circuits (RISC), application specific integrated circuits (ASIC), logic circuits, and any other circuit or processor capable of executing the functions/methods described herein. Regardless of the type of processor, it is configured to execute one or more of the methods described herein. The controller may be integrated into the IVD device, may be integrated into a unit, a sub-unit or a module of an IVD device, or may be a separate logic entity in communication with the IVD device or its units, sub-units or modules via a direct connection, wired or wirelessly, or indirectly over a communications network, wired or wirelessly, such as a wide area network, e.g., the Internet or a Health Care Provider's local area network or intranet, via a network interface device. In some aspects, the controller might be integral with a data management unit, e.g., implemented on a computing device such as a desktop computer, a laptop, a smartphone, a tablet, PDA, etc., or it may be comprised by a server computer and/or be distributed/shared across/between a plurality of IVD devices. Moreover, the systems can include remote devices, servers and cloud-based elements that communicate via wires or wirelessly (e.g., infrared, cellular, Bluetooth®), or a remote PC/server or a cloud-based system. The processor may be also configurable to control the IVD device in a way that workflow(s) and workflow step(s) are conducted by the IVD device.

According to an aspect of the present disclosure, the fluidic system further comprises a valve that controls fluid passage between the pump and the probe.

According to an aspect of the present disclosure, the electrically conductive probe is configured to detect a liquid level by determining contact with a liquid surface by any one or combination of measuring principles comprising capacitance, resistance, conductivity, induction measuring principle. Typically, a liquid level detection is performed on a liquid in a liquid container. A liquid container may refer to, e.g., a sample container, a QC vial, a calibration vial, a reagent container, etc. When moving the probe into a liquid container for aspiration or dispensation, typically in a vertical downward direction, it is crucial to detect when the probe touches the surface of the liquid inside the liquid container in order to minimize the risk of cross-contamination or prevent damages to the probe, e.g., by crashing into the bottom of the liquid container. Two examples of methods for detecting the presence of a liquid that are based on measuring electrical signals have already been described above. Since these methods are well established and known in the prior art, they will not be described in further detail.

According to an aspect of the present disclosure, the probe is translatable and/or rotatable horizontally and translatable vertically with respect to the reference element or a liquid. Typically, in an IVD device the aspiration of a liquid is conducted at a certain position in the device, whereas the dispensation of the liquid is conducted at a position different from the aspiration position. For example, an aliquot of a liquid sample is aspirated from a sample container and is required to be transported and dispensed into a reagent vessel located at a different position than the sample container, e.g., for incubation or for transfer to an analytical module etc. In addition, washing of the probe may be conducted at a dedicated position in the device, e.g., at a washing position. The probe, which is typically a part of a pipetting unit, is usually configured to be movable so that different operating steps can be performed at different positions within the IVD device. The probe may move between positions in translational movements horizontally, i.e., in a Cartesian x-direction and/or y-direction. Alternatively, it may move horizontally in a rotational movement. Typically, the probe is configured to move in a translational vertical movement, i.e., in a Cartesian z-direction, e.g., to lower the probe into a sample container, into a reagent container, into a wash station or to a teaching reference point when calibrating the movements of the pipetting head.

According to an aspect of the present disclosure, the valve is positioned at a level vertically lower than a level of the tip of the probe in a leakage determining position. Typically, there are certain constraints on the size of an IVD device due to limited space in IVD laboratories. Therefore, IVD devices are designed to have a footprint as small as possible. Oftentimes, consumables or reagents are to be inserted or stored in a lower part of the device, whereas sample handling and analytical operations are conducted at an elevated level of the device, typically at a working height of an operator. It may therefore occur that certain fluids, such as system fluids or wash solutions may have to be transported from a lower part of the device to a higher level, which can be achieved by pumps. In consequence, the IVD device may be designed that a valve controlling fluid passage between a fluid supply and a probe is installed at a lower level than the probe, in particular at a level vertically lower than the tip of the probe in a leakage determining position. In such a situation, the leakage test may comprise keeping the pump deactivated for the measuring time period so that any determined leakage can be traced with high certainty to a leak in the fluidic conduit, where the fluidic conduit is at least in part at a level vertically above the level of the tip of the probe. To determine whether the valve is leaking, the leakage test may comprise activating the pump during the measuring time period. Since the probe may be translationally movable in a vertical direction, the leakage determining position may be determined accordingly, i.e., so that the valve is at a level vertically lower than the tip of the probe if the probe is positioned in the leakage determining position during the leakage test. However, outside of the leakage determining position, the tip of the probe may be lowered to a level vertically below the valve.

According to an aspect of the present disclosure, the device further comprises an alert function configured to indicate leakage determination and the at least one maintenance action. As mentioned above, an alert may refer to any kind of visual or acoustic or audio-visual presentation to an operator of the IVD device, indicating that at least one automatic maintenance action is about to be performed and/or a manual maintenance action is required, possibly indicating the location of the leak or requesting the operator to confirm the proposed maintenance action or instructing how to conduct the manual maintenance action. An alert function may therefore be any kind of light source, e.g., to emit a light of a certain wavelength or a flashing light signal. An alert function may further be a functional unit for emitting an acoustic signal to attract the operator's attention, e.g., a loudspeaker or a siren. An alert function may further be a visual information displayed to the operator on a display of the IVD device, possibly containing more detailed instructions on how a manual maintenance action needs to be conducted in order to resolve the leakage. As the skilled person will recognize, an alert may also refer to any combinations of the above mentioned examples.

According to an aspect of the present disclosure, the controller is configured to initiate the method of performing a leakage test of a fluidic system at a predefined time interval or in response to a trigger event or in response to an operator input. The leakage test can be performed at predefined time intervals, e.g., daily, weekly, monthly, periodically during routine operation, as part of a sample measurement procedure, at instrument initialization, and the like. It may be performed in combination with other instrument maintenance operations, e.g., a QC measurement or a calibration, that are typically performed at regular time intervals. It may further be performed in response to a trigger event, e.g., an out-of-specification QC measurement or calibration result. Alternatively, the controller may initiate the leakage test based on a manual input by an operator of the IVD device. For example, the operator may request a leakage test on a user interface of the IVD device.

In order that the embodiments of the present disclosure may be more readily understood, reference is made to the following examples, which are intended to illustrate the disclosure, but not limit the scope thereof.

FIG. 1 shows schematically an example of an in-vitro diagnostic device (IVD device) 100 comprising a fluidic system 10 and a controller 90. The fluidic system 10 comprises an electrically conductive probe 11 that is fluidically connected to a fluid supply 12 via a fluidic conduit 18. The fluidic system 10 further comprises a pump 14 configured to pump a fluid, e.g., a system fluid, from the fluid supply 12 to the probe 11 when activated.

The probe 11 is configured to perform pipetting operations, i.e., aspirating and/or dispensing of fluids. To achieve more flexibility, the fluidic system 10 of the present example further comprises a syringe pump 20 for aspirating and/or dispensing of fluids via the probe 11, e.g., a sample from a sample container (not shown). Alternatively, the pump 14 could be used for aspiration and/or dispensation of a sample via the probe 11. However, syringe pumps 20 typically enable more precise dosing than pumps 14 used for moving bulk fluids.

According to another aspect of the invention, the probe 11 is translatable and/or rotatable horizontally and translatable vertically with respect to a reference element 30 or a liquid. With reference to FIG. 1, the probe 11 is attached to a pipetting head 40, where the pipetting head 40 can be operated to move translationally or rotationally in a horizontal plane, i.e., in x and/or y direction. The pipetting head 40 may further be configured to move in a vertical direction, i.e., along the z-axis, e.g., in order to move the probe 11 into a sample container or to position the tip of the probe 11 at a predetermined distance from a reference surface 31 of the reference element 30. Alternatively, the probe 11 may be movably attached to the pipetting head 40 so that it can be operated to translationally move in a vertical direction relative to the pipetting head 40. An IVD device 100 may contain a plurality of probes 11, at least part of which may be configured to perform the same operations, e.g., aspiration and dispensation of samples or aspiration and dispensation of reagents, etc. In such a setup, the plurality of probes 11 may be attached to the same pipetting head 40, which allows parallelization and thereby increases throughput. The plurality of probes 11 may be movably attached to the pipetting head 40 so that they can be moved individually relative to the pipetting head 40, e.g., in a vertical direction.

With continued reference to FIG. 1, the probe 11 is positioned so that the tip of the probe 11 is at a predetermined distance from the reference surface 31 of the reference element 30 when performing the leakage test. This is achieved by controlling the pipetting head 40 and/or probe 11 and/or reference element 30 to move accordingly in relation to each other. The leakage test is based on the detection of a liquid between the probe 11 and the reference surface 31. In case of leakage, the pressure inside the fluidic system 10 cannot be maintained, which affects the fluid inside the fluidic system 10 to flow from a vertically higher level to a vertically lower level. As consequence, a drop of system fluid forms at the tip of the probe 11 and extends towards the reference surface 31 due to gravitational force.

In the example illustrated in FIG. 1, the potential presence of a liquid is detected by a capacitive detection method. The probe 11 and the reference element 30 are in electrical operative connection in the sense that an electrical potential difference can be applied in-between. The probe 11 may be a measuring electrode and the reference element 30 may comprise a ground electrode or vice versa. The probe 11 and the reference element 30 are electrically connected to a measurement unit 32 that is configured to apply, e.g., a DC voltage or an AC voltage between the probe 11 and the reference element 30.

According to an aspect of the present disclosure, the probe 11 is configured to detect a liquid level by determining contact with a liquid surface, e.g., in a liquid container (not shown), by any one or combination of measuring principles comprising capacitance, resistance, conductivity or induction measuring principle. The technical principle that is implemented in the device 100 for detecting a liquid level in a liquid container can be the same technical principle used for performing the leakage test according to the present disclosure.

Figure 2:
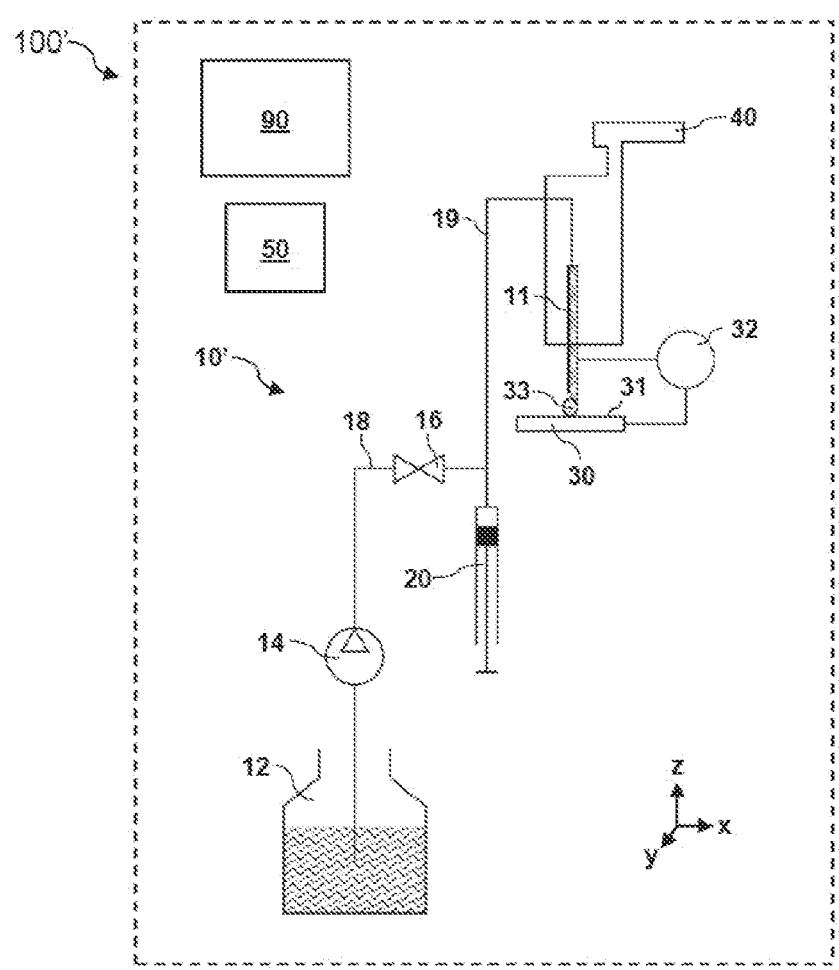
FIG. 2 shows a variant of the IVD device of FIG. 1 according to further aspects of the present disclosure.

FIG. 2 shows schematically another example of an IVD device 100' according to further aspects of the present disclosure. The device 100' comprises a fluidic system 10', a controller 90 and an alert function 50. The fluidic system 10' comprises an electrically conductive probe 11 that is fluidically connected to a fluid supply 12 via a fluidic conduit 18, 19. The fluidic system 10' further comprises a pump 14 configured to pump a fluid, e.g., a system fluid, from the fluid supply 12 to the probe 11, when activated.

According to an aspect of the present disclosure, the fluidic system 10' further comprises a valve 16 that controls fluid passage between the fluid supply 12 and the probe 11. The valve is thereby located downstream of the pump 14, i.e., between the pump 14 and the probe 11. The probe 11 is configured to perform pipetting operations, i.e., aspirating and/or dispensing of fluids. Analogous to the example illustrated in FIG. 1, the fluidic system 10' of the present example comprises a syringe pump 20 for aspirating and/or dispensing of fluids via the probe 11, e.g., a sample from a sample container (not shown). While aspirating a sample from a sample container by operating the syringe pump 20, the valve 16 is typically in a closed state, thereby preventing fluid passage from one part of the fluidic conduit 19 through the valve 16 into another part of the fluidic conduit 18. The probe 11 is further attached to a pipetting head 40 and translationally and/or rotationally movable in a horizontal plane and translationally movable in a vertical direction.

In analogy to the previous example, the probe 11 is positioned so that the tip of the probe 11 is at a predetermined distance from the reference surface 31 of the reference element 30 when performing the leakage test. A drop of liquid 33, e.g., a drop of system fluid, that forms at the tip of the probe 11 and comes in contact with the reference surface 31 induces a change in capacitance, indicating a leakage in the fluidic system 10'. The change in capacitance is detected by the measurement unit 32. In response to determining a leakage, at least one maintenance action is triggered. The maintenance action may comprise generating an alert indicating the at least one maintenance action.

The IVD device 100' comprises an alert function 50 configured to indicate leakage determination and the at least one maintenance action according to an aspect of the invention. The alert function 50 may refer to any kind of visual or acoustic or audio-visual presentation to an operator of the IVD device 100'. In the present example, the alert function 50 may refer to displaying the alert in a visual format on a display integrated into the IVD device 100' in response to determining a leakage in the fluidic system 10'. The displayed information may indicate that a leakage has been determined and which maintenance action has been triggered. It may further display detailed instructions on how to perform a manual maintenance action in order to resolve the leakage or it may indicate the location of the leak, etc. The alert function 50 is controlled by the controller 90.

According to an aspect of the present disclosure, the valve 16 is positioned at a level vertically lower than a level of the tip of the probe 11 in a leakage determining position. The IVD device 100' in the example of FIG. 2 is designed so that the fluid supply 12, containing, e.g., a system fluid or a wash solution, is positioned in a lower part of the device 100'. This requires to pump the fluid to a higher level in the device 100, e.g., to the probe 11. Positioning the valve 16 at a level vertically lower than a level of the tip of the probe 11 allows for a better localization of a potential leakage. For example, if the leakage test is conducted with deactivated pump 14 and a closed valve 16 and a leakage is detected, the leak must have occurred in the part of the fluidic conduit 19 between the valve 16 and the probe 11, where the fluidic conduit 19 is at least in part at a level vertically above the level of the tip of the probe 11. To determine whether the valve 16 is leaking, the leakage test may comprise activating the pump 14 during the measuring time period.

Figure 3:
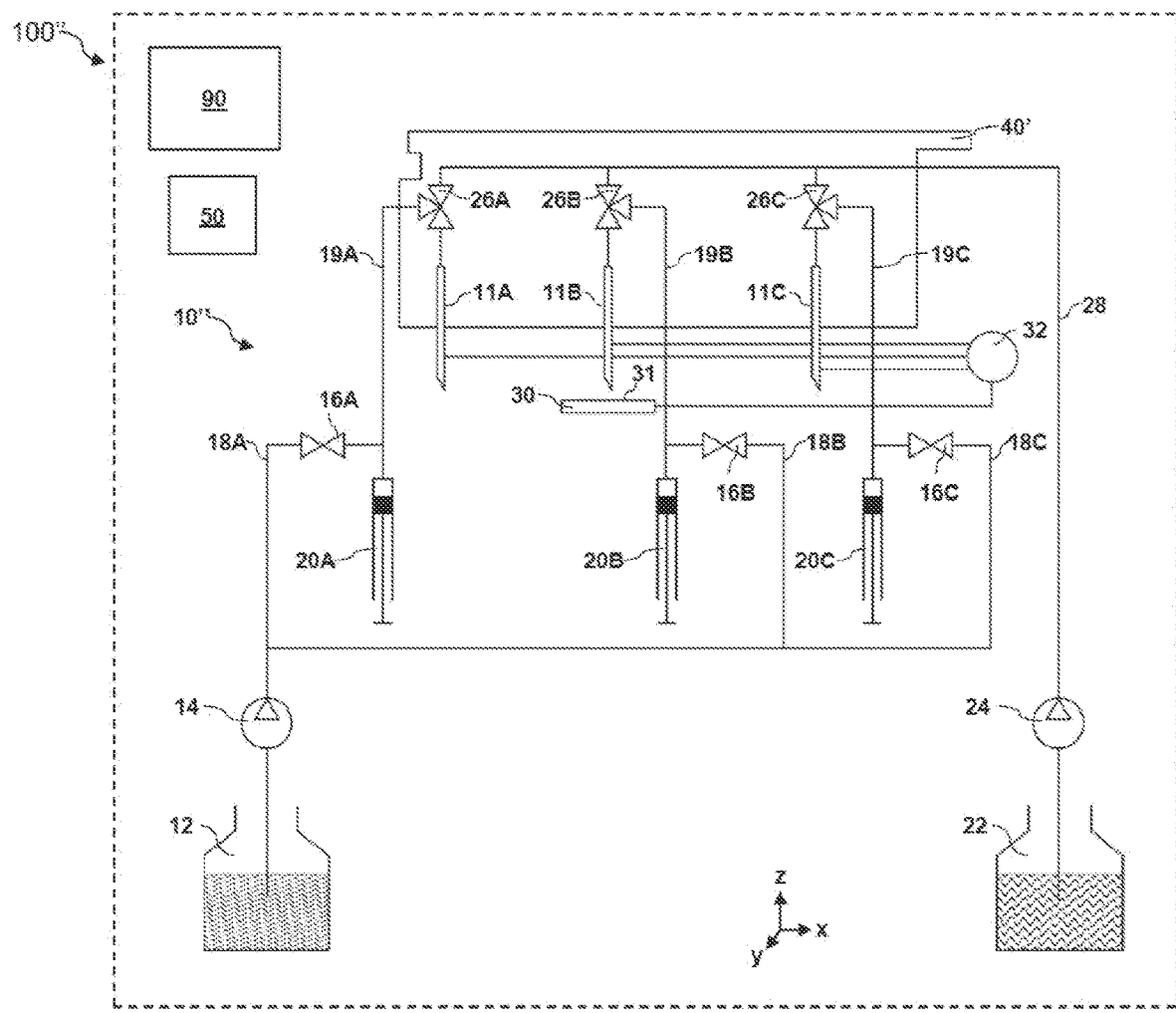
FIG. 3 shows yet another variant of the IVD device of FIG. 1 and FIG. 2 according to further aspects of the present disclosure.

FIG. 3 shows schematically another example of an IVD device 100" according to another aspect of the invention. The IVD device 100" comprises a fluidic system 10" a controller 90 and an alert function 50. The fluidic system 10" comprises a plurality of electrically conductive probes 11A, 11B, 11C that are fluidically connected to a first fluid supply 12 via a first fluidic conduit 18A, 18B, 18C, 19A, 19B, 19C and to a second fluid supply 22 via a second fluidic conduit 28. The fluidic system 10" further comprises a first pump 14 configured to move a fluid from the first fluid supply 12 to the probes 11A, 11B, 11C when activated and a second pump 24 configured to move a fluid from the second fluid supply 22 to the probes 11A, 11B, 11C when activated.

According to an aspect of the invention, the fluidic system 10" comprises a first set of valves 16A, 16B, 16C that control fluid passage in the first fluidic conduit 18A, 18B, 18C, 19A, 19B, 19C between the fluid supply 12 and the probes 11A, 11B, 11C, respectively. The valves 16A, 16B, 16C are thereby located downstream of the pump 14, i.e., between the pump 14 and the probes 11A, 11B, 11C, respectively. Analogous to the examples illustrated in FIGS. 1 and 2, the fluidic system 10" of the present example comprises respective syringe pumps 20A, 20B, 20C for aspirating and/or dispensing of fluids via the probes 11A, 11B, 11C, e.g., for aspirating of samples from sample containers (not shown). While aspirating or dispensing by operating a syringe pump 20, the respective valve 16A, 16B, 16C is typically in a closed state, thereby preventing fluid passage from one part of the fluidic conduit 19A, 19B, 19C through the respective valve 16A, 16B, 16C into another part of the fluidic conduit 18A, 18B, 18C, respectively.

The fluidic system 10" further comprises a second set of valves 26A, 26B, 26C that are configured to switch between the first fluidic conduit 18A, 18B, 18C, 19A, 19B, 19C and the second fluidic conduit 28 to control fluid passage from either the first fluid supply 12 or from the second fluid supply 22 into the probes 11A, 11B, 11C. For example, the second fluid supply 22 may contain a wash solution for washing the probes 11A, 11B, 11C. In a washing procedure, the probes 11A, 11B, 11C are typically moved to a washing position (not shown). The second pump 24 is activated to provide wash solution from the second fluid supply 22 to the probes 11A, 11B, 11C via the second fluidic conduit 28. The second set of valves 26A, 26B, 26C are switched to an open state with regard to the second fluidic conduit 28 and to a closed state with regard to the first fluidic conduit 18A, 18B, 18C, 19A, 19B, 19C, allowing wash solution to pass through to the probes 11A, 11B, 11C. In a second step of the washing procedure, the probes 11A, 11B, 11C may be flushed with another fluid, e.g., a system fluid, which is provided from the first fluid supply 12. Therefore, the second pump 24 is deactivated to cease provision of the wash solution and the second set of valves 26A, 26B, 26C are switched to an open state with regard to the first fluidic conduit 18A, 18B, 18C, 19A, 19B, 19C and a closed state with regard to the second fluid conduit 28. The first set of valves 16A, 16B, 16C are switched to an open state. The first pump 14 is activated in order to pump system fluid from the first fluid supply 12 into the probes 11A, 11B, 110. In another example, the second set of valves 26A, 26B, 26C may be switched to a closed state with regard to both the first fluidic conduit 18A, 18B, 18C, 19A, 19B, 19C and the second fluidic conduit 28.

Analogous to the examples in FIGS. 1 and 2, the probes 11A, 11B, 11C are attached to a pipetting head 40', where the pipetting head 40' can be operated to move translationally or rotationally in a horizontal plane, i.e., in x and/or y direction. The pipetting head 40' may further be configured to move in a vertical direction, i.e., along the z-axis. The probes 11A, 11B, 11C may be movably attached to the pipetting head 40' so that they can be individually operated to translationally move in a vertical direction relative to the pipetting head 40', e.g., in order to individually move any of the probes 11A, 11B, 11C into a sample container or to individually position the tip of any of the probes 11A, 11B, 11C at a predetermined distance from the reference surface 31 of the reference element 30. Attaching a plurality of probes to the same pipetting head 40' allows parallelization and thereby increases throughput.

In the example as illustrated in FIG. 3, a leakage test may be performed with each of the probes 11A, 11B, 11C individually. When performing the leakage test, the respective probe 11B is positioned so that the tip of the probe 11B is at a predetermined distance from the reference surface 31 of the reference element 30. The probes 11A, 11B, 11C and the reference element 30 are electrically connected to a measurement unit 32 that is configured to apply an electrical potential difference, e.g., a DC voltage or an AC voltage between the respective probe 11B and the reference element 30. The measurement unit 32 is further configured to detect an electrical signal or change in electrical signal. To perform a leakage test on a part of the fluidic system 10" comprising the first fluidic conduit 18B, 19B and the valve 16B that are fluidically connected to probe 11B, the respective second valve 26B is switched to an open state in regard of the first fluidic conduit 18B, 19B and to a closed state with regard to the second fluidic conduit 28. If an electrical signal or a change in an electrical signal is detected between the probe 11B and the reference element 30 by the measurement unit 32 in a predetermined measuring time period, a leakage is determined to have occurred anywhere in the probe 11B or the fluidic conduit 19B between the valve 16B and the probe 11B or in the valve 16B or in the fluidic conduit 18B between the pump 14 and the valve 16B, depending on whether the valve 16B was in a closed or open state and whether the pump 14 was activated or deactivated during the measuring time period. At least one corresponding maintenance action is triggered. The leakage test may then be repeated in an analogous manner for any other part of the fluidic system 10", comprising, e.g., fluidic conduits 18A, 18C, 19A, 19C and valves 16A, 16C in fluidic connection with the probes 11A, 11C. Alternatively, the IVD device 100" may comprise a plurality of reference elements 30 in order to enable parallel leakage tests with a plurality of or with all probes 11A, 11B, 11C at the same time. Analogously, a leakage test may be performed on the part of the fluidic system 10" comprising the second fluidic conduit 28. Therefore, the respective valve of the second set of valves 26A, 26B, 26C is switched to an open state with regard to the second fluidic conduit 28 and to a closed state with regard to the first fluidic conduit 18A, 18B, 18C, 19A, 19B, 19C.

Figure 4:
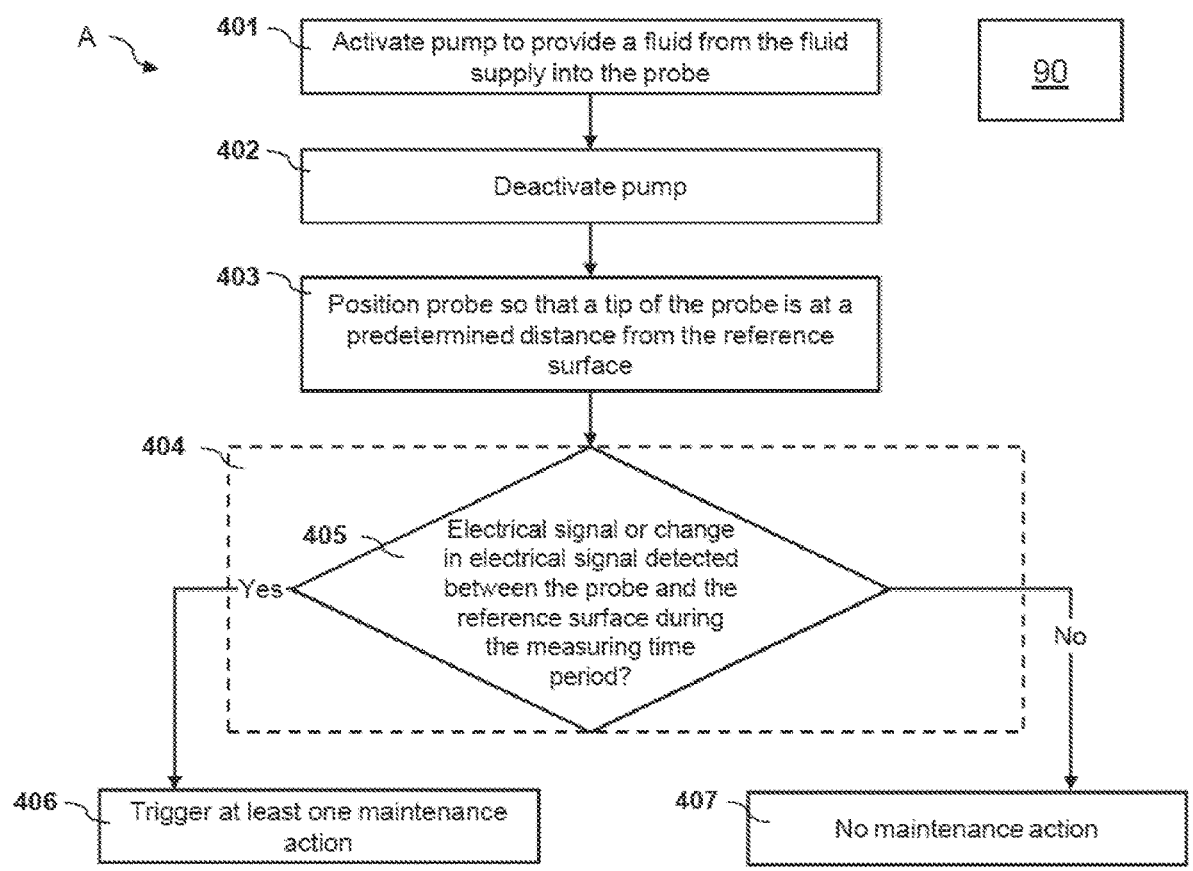
FIG. 4 shows a flow diagram of a method of performing a leakage test according to an aspect of the present disclosure.

FIG. 4 shows a flow diagram of an automated method A of performing a leakage test in a fluidic system of an IVD device according to an aspect of the present disclosure, the IVD device comprising a controller 90 configured to control the device to perform the leakage test according to method A. In particular, the method includes activating a pump 401 to provide a fluid from the fluid supply into the probe. The pump is thereby operated in a pumping mode long enough to ensure that the entire fluidic conduit and probe subject to the leakage test are have been supplied with the respective fluid. Any excess of fluid provided from the fluid supply may be discarded through the tip of the probe, typically into a fluid waste unit of the IVD device. When the fluidic conduit and probe are filled with fluid, the method comprises deactivating the pump 402 to stop further supply of fluid. For example, with reference to FIG. 1, the pump 14 is activated and operated in a pumping mode until the fluidic conduit 18 and the probe 11 are filled with fluid from the fluid supply 12. Once the probe 11 is filled with fluid, the pump 14 is deactivated to stop further supply of fluid.

With continued reference to FIG. 4, the probe is then positioned so that its tip is at a predetermined distance from the reference surface of the reference element 403. Positioning the probe may involve controlling the movement of the pipetting head and/or the respective probe. For example, with reference to FIG. 1, the pipetting head 40 is controlled to move in an x- and y-direction to position the probe 11 above the reference surface 30. The probe 11 is then controlled to move in a vertical downward movement in relation to the pipetting head 40 until its tip reaches the predetermined distance from the reference surface 31.

With continued reference to FIG. 4, the method comprises monitoring and possibly detecting, in a predetermined measuring time period 404, whether an electrical signal or a change in an electrical signal between the probe and the reference surface occurs 405. The predetermined measuring time period 404 is a time period that defines the maximal duration of the monitoring/detecting step 405. The start of the measuring time period 404 may coincide with the time point the tip of the probe reaches the predetermined distance from the reference surface. Detecting an electrical signal or a change in an electrical signal within the measuring time period 404 indicates that the fluidic system is leaking. As a consequence, as soon as the electrical signal or change in electrical signal is detected, the measuring time period 404 is stopped and at least one maintenance action is triggered 406. If the predetermined measuring time period 404 ends without the detection of an electrical signal or change in electrical signal between the probe and the reference surface in step 405, the fluidic system is considered not leaky and no maintenance action is required 407.

Figure 5:
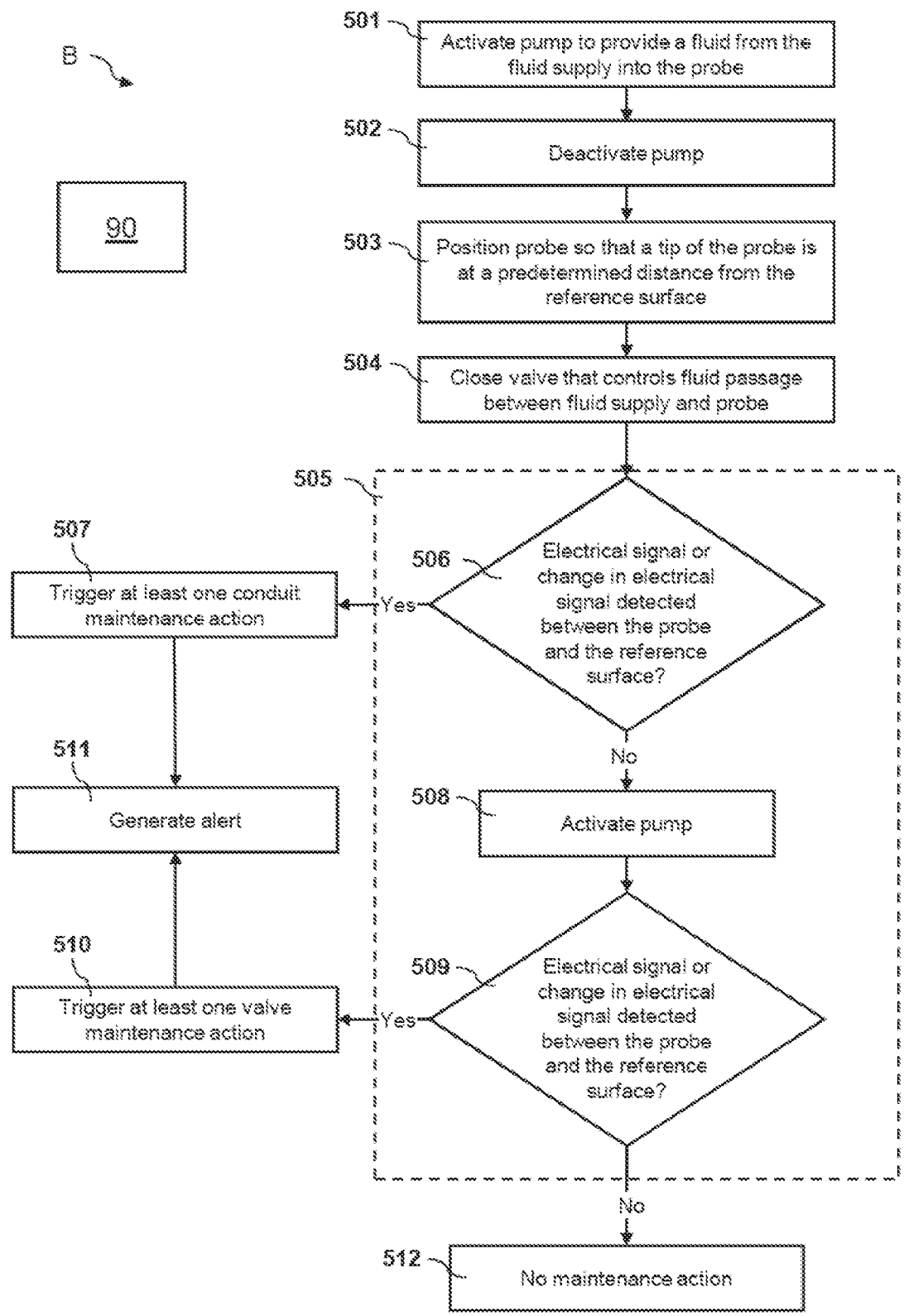
FIG. 5 shows a flow diagram of a method of performing a leakage test according to further aspects of the present disclosure.

FIG. 5 shows a flow diagram of an automated method B of performing a leakage test in a fluidic system of an IVD device according to further aspects. The IVD device comprises a controller 90 configured to control the device to perform the leakage test according to method B. The first three method steps 501, 502, 503 are analogous to the first three method steps 401, 402, 403 of method A illustrated in FIG. 4 and will therefore not be further discussed here. The method B further comprises closing the valve that controls fluid passage between the fluid supply and the probe 504 before starting the measuring time period 505 or at latest when the measuring time period 505 starts. When the valve is in a closed state, it is switched or positioned in a way that fluid passage is prevented. Analogous to method A, the method B comprises monitoring and possibly detecting, in a predetermined measuring time period 505, whether an electrical signal or a change in an electrical signal between the probe and the reference surface occurs 506, 509. With respect to method A, the method B further comprises activating the pump 508 at a predetermined time point within the predetermined measuring time period 505, e.g., after half of the predetermined measuring time period 505 has elapsed or after two-thirds of the predetermined measuring time period 505 have elapsed, as long as up to that time point no electric signal or change in electrical signal has been detected between the probe and the reference surface 506 that would have ended the measuring time period 505. If an electrical signal or change in electrical signal is detected in the monitoring/detecting step 506 before the predetermined time point for activating the pump 508 is reached, it is an indication that the fluidic system is leaking. Based on the fact that at the time point of detection, the valve was in a closed state and the pump was deactivated, it can be excluded that the valve is leaking. Hence, the leak has occurred in the fluidic conduit between the valve and the probe. As consequence, as soon as the electrical signal or change in electrical signal is detected, the measuring time period 505 is stopped and at least one conduit maintenance action is triggered 507.

Activating the pump 508 when performing the leakage test leads to a pressure increase in the fluidic conduit and/or on the closed valve located downstream of the pump. Hence, a detection of an electrical signal or change in electrical signal in a monitoring/detecting step 509 after the pump has been activated 508 indicates the leak has very likely occurred in the valve. A valve maintenance action is triggered 510 in response. Activating the pump 508 during the measuring time period 505 may be implemented in a device in which the fluid supply and/or valve and/or parts of the fluidic conduit are installed at a level vertically lower than the tip of the probe and where the fluid is required to be moved against gravitational forces.

The method B further comprises generating an alert 511 in response to a determined leakage, where the alert indicates at least one triggered maintenance action, e.g., by displaying the alert on a display of the IVD device, possibly with further information on the type of triggered maintenance action and/or the anticipated location of the leak, etc. If the predetermined measuring time period 505 ends without the detection of an electrical signal or change in electrical signal between the probe and the reference surface, the fluidic system is considered not leaky and no maintenance action is required 512.

Applying the method B to the example illustrated in FIG. 2, the method includes activating the pump 14 to provide a fluid from the fluid supply 12 into the probe 11. When the fluidic conduit 18, 19 and probe 11 are supplied with the respective fluid (illustrated by the waved lines in the probe 11), the method comprises deactivating the pump 14 to stop further supply of fluid. The probe 11 is then positioned so that its tip is at a predetermined distance from the reference surface 31 of the reference element 30, e.g., by controlling the movement of the pipetting head 40 and/or the respective probe 11. The valve 16 is closed before starting the measuring time period or at latest when the measuring time period starts. A leakage in the fluidic system 10' leads to a discharge of fluid 33 from the tip of the probe 11. Once the drop of fluid 33 makes contact with the reference surface 31, an electrical signal or change in electrical signal is detected. If the detection occurs in a phase of the measuring time period in which the pump 14 is deactivated, the leak has likely occurred in the part of the fluidic conduit 19 between the valve 16 and the probe 11 and at least one corresponding conduit maintenance action is triggered. If the detection occurs after the pump 14 is activated, the leak has likely occurred in the valve 16 and at least one corresponding valve maintenance action is triggered.

Figure 6:
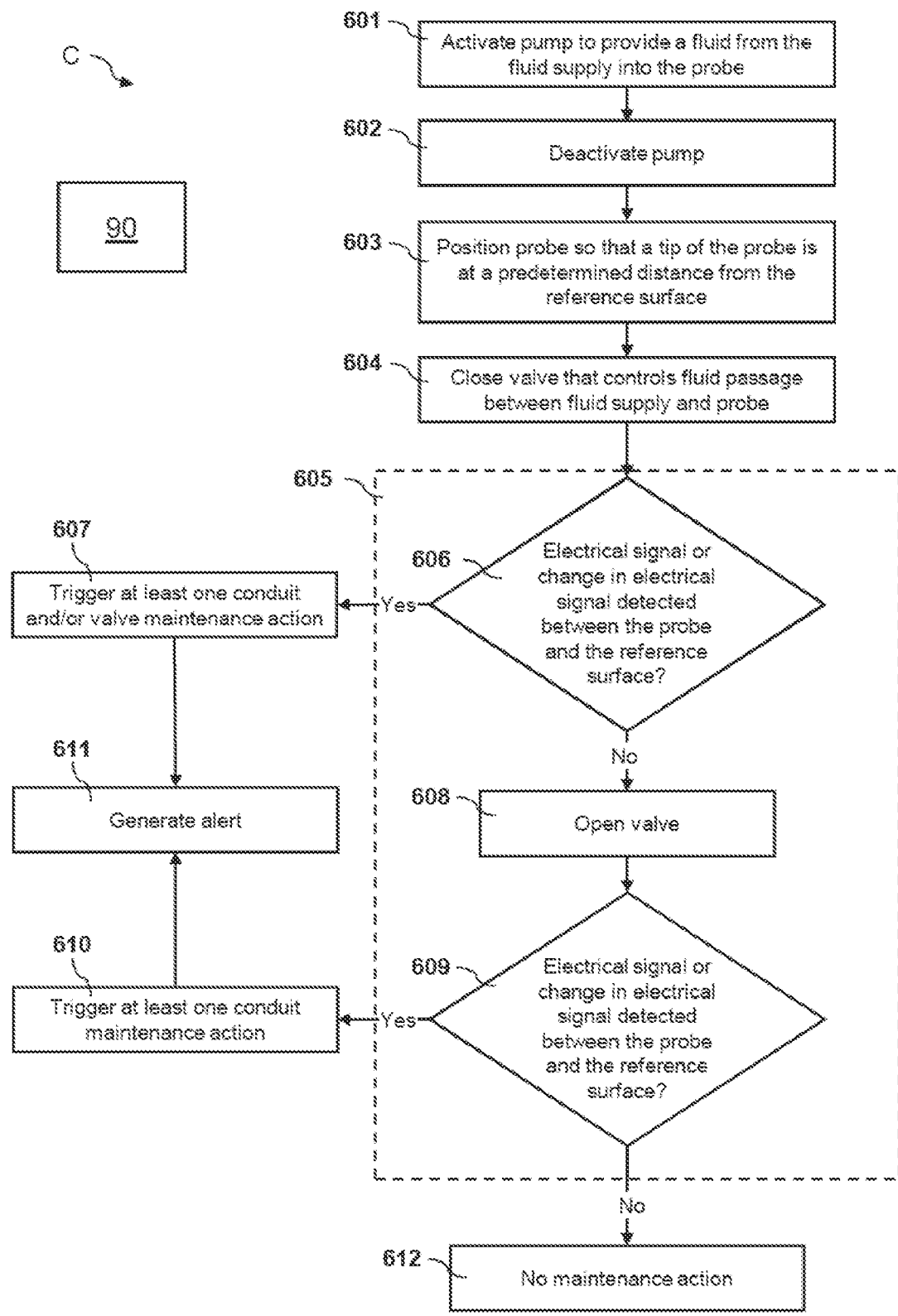
FIG. 6 shows a flow diagram of a method of performing a leakage test according to a further aspect of the present disclosure.

FIG. 6 shows a flow diagram of an automated method C of performing a leakage test in a fluidic system of an IVD device according to further aspects. The IVD device comprises a controller 90 configured to control the device to perform the leakage test according to method C. The leakage test according to method C may be implemented in a device, in which the valve and parts of the fluidic conduit are installed at a level vertically above the tip of the probe. Method C differs from method B in that it comprises a method step in which the valve is opened 608 at a predetermined time point within the predetermined measuring time period 605, e.g., after half of the predetermined measuring time period 605 has elapsed or after two-thirds of the predetermined measuring time period 605 have elapsed, as long as up to that time point no electric signal or change in electrical signal has been detected between the probe and the reference surface 606 that would have ended the measuring time period 605. If an electrical signal or change in electrical signal is detected in the monitoring/detecting step 606 before the predetermined time point for opening the valve 608 is reached, it is an indication that the fluidic system is leaking. Since the valve was in a closed state and the pump was deactivated at the point of detection, the leak has likely occurred in the fluidic conduit between the valve and the probe or in the valve. The measuring time period 605 is stopped upon detecting the electrical signal or change in electrical signal and at least one conduit and/or valve maintenance action is triggered 607. If an electrical signal or change in electrical signal is detected in the monitoring/detecting step 609 after the valve has been opened 608, it is an indication that the fluidic system is leaking upstream of the valve, i.e., in the fluidic conduit between pump and valve. Since no leakage was detected while the valve was closed 606, it can be excluded that the leak occurred in the valve or in the fluidic conduit between the valve and the probe. The measuring time period 605 is stopped upon detecting the electrical signal or change in electrical signal and at least one conduit maintenance action is triggered 610. All other method steps are analogous to the corresponding method steps of method B illustrated in FIG. 5 and are therefore not discussed in further detail here.

Figure 7:
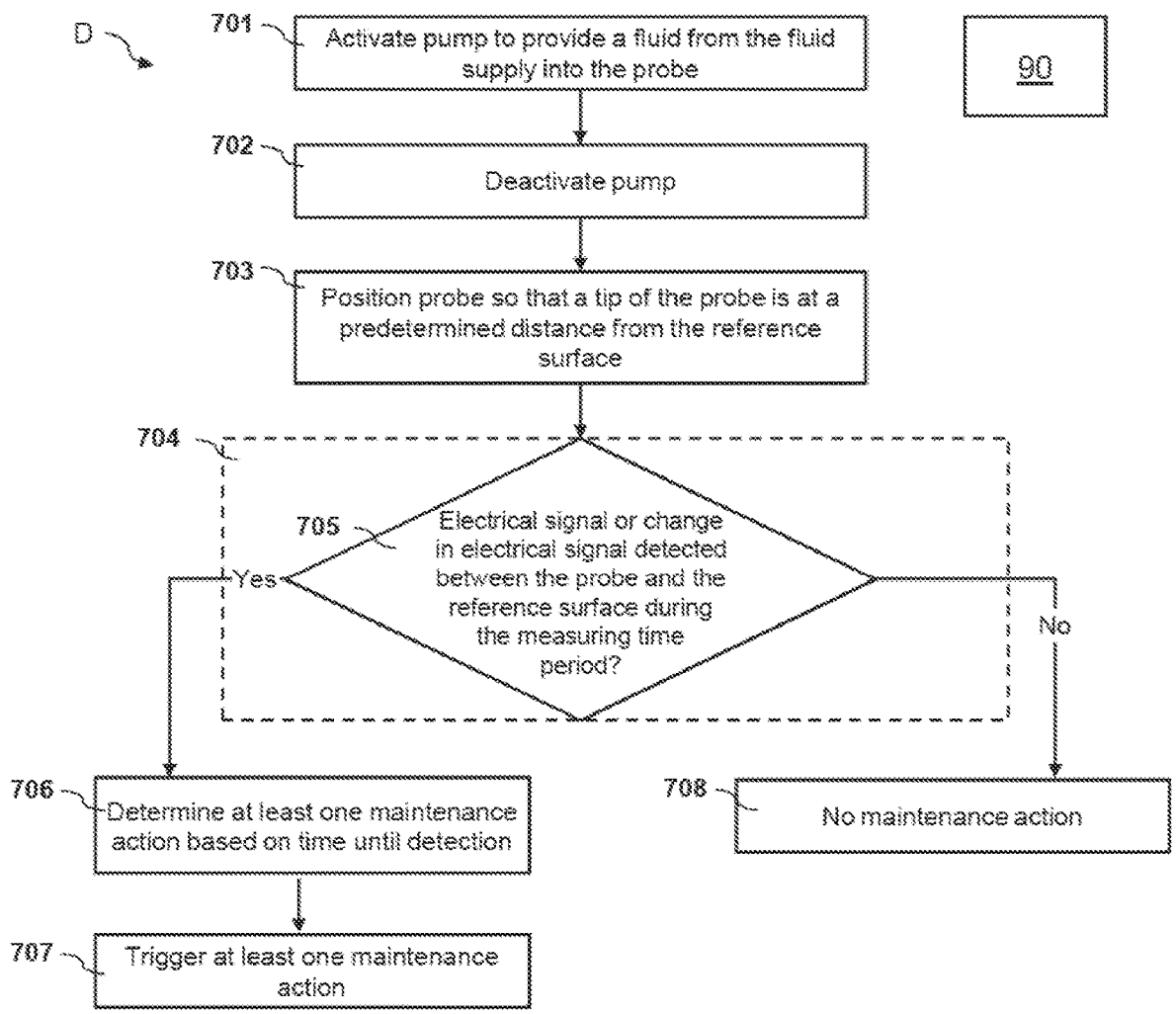
FIG. 7 shows a flow diagram of a method of performing a leakage test according to a further aspect of the present disclosure.

FIG. 7 shows a flow diagram of an automated method D of performing a leakage test in a fluidic system of an IVD device according to further aspects. The IVD device comprises a controller 90 configured to control the device to perform the leakage test according to method D. With respect to previously described methods A, B, C, the leakage test according to method D further comprises a method step 706, in which the at least one maintenance action is determined based on a time until detection. The time until detection begins at the start of the predetermined measuring time period and lasts until the detection of an electrical signal or change in electrical signal. Based on the length of the time until detection, certain characteristics of the leak can be deduced. For example, the length of the time until detection may correlate with the size of the leak, i.e., the shorter the time until detection, the bigger the leak. All other method steps are analogous to the corresponding method steps of the previously described methods, e.g., method A illustrated in FIG. 4, and are therefore not discussed in further detail here. As the skilled person will recognize, the method step of determining at least one maintenance action based on the time until detection may be combined with determining the maintenance action based on the location of the leak, as described in the previous methods A, B, C.

Figure 8A:
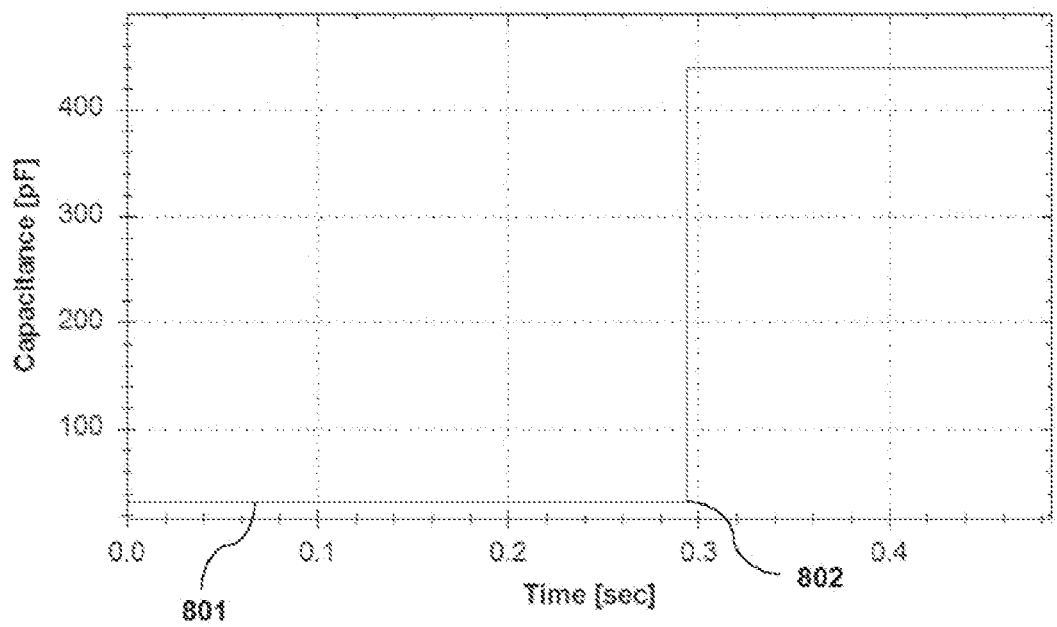
FIGS. 8a-8b show diagrams illustrating changes in electric signals over time during a leakage test.
Figure 8B:
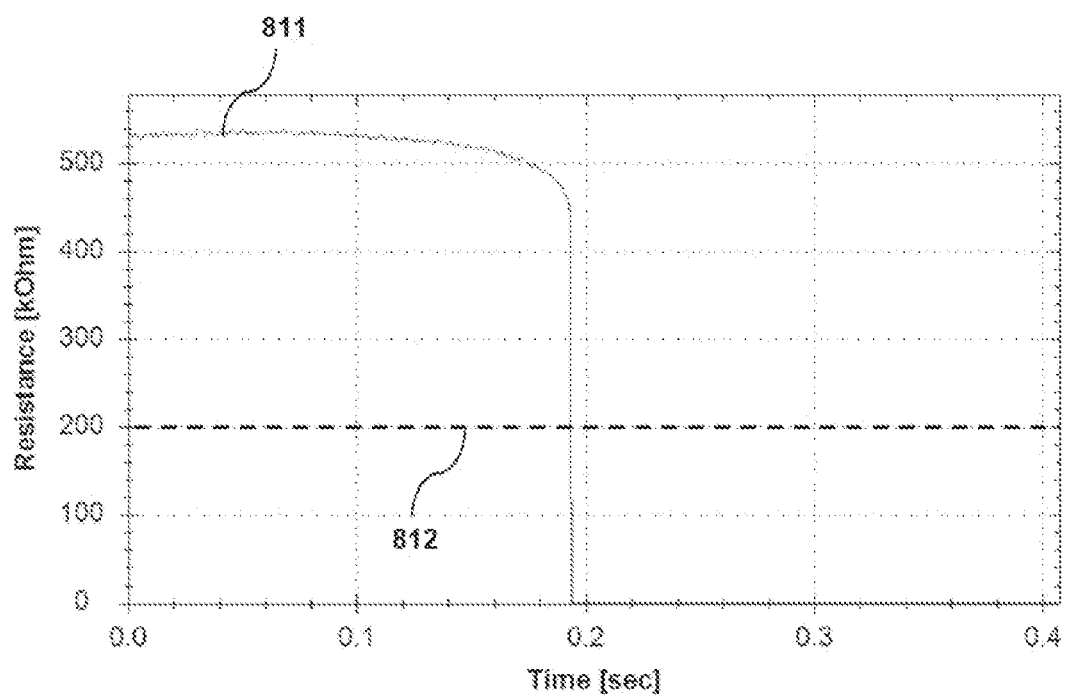

FIGS. 8a and 8b show diagrams illustrating changes in electric signals over time during a leakage test. According to the presently disclosed automated method of performing a leakage test, the method comprises a step of determining a leakage upon detecting an electrical signal or a change in an electrical signal between the probe and the reference element. The diagram in FIG. 8a illustrates a change of such an electrical signal, namely capacitance, in picofarad [pF] over time in seconds [sec], where capacitance may be measured by the measurement unit. The time span covered in the diagram on the x-axis may correspond to the predetermined measuring time period or it may correspond to a segment of the predetermined measuring time period. The time point 0 represents the start of the predetermined measuring time period and therefore coincides with the start of the leakage test. At this time point, the probe and corresponding fluidic conduit connecting the probe with the fluid supply are supplied with fluid. The probe is further positioned so that the tip of the probe is at a predetermined distance from the reference surface of the reference element. When the leakage test starts, the measurement unit is controlled to apply an electric potential between the probe and the reference element, e.g., a DC voltage or an AC voltage to the probe and/or the reference element. Depending on the detection method, a baseline electric signal may be measured in the stage of the leakage test in which no leakage is determined 801. For example, the diagram in FIG. 8a shows a baseline capacitance measurement of approx. 30 pF, which may also be assigned to noise. In case of a leakage in the fluidic system, the pressure inside the fluidic system cannot be maintained resulting in a discharge of fluid at the tip of the probe. Once the fluid makes contact with the reference surface, the electrical signal changes accordingly, thereby confirming the presence of a leak in the fluidic system. In the example of FIG. 8a, a change in an electrical signal 802 is detected after approx. 0.3 seconds, where the capacitance increases from approx. 30 pF to approx. 440 pF. The capacitance is affected by the fluid that is now present between the probe and the reference surface, where there previously has been air. A leakage can be determined independent of the magnitude of the signal change. The detected change in electrical signal triggers at least one maintenance action. According to an aspect of the present disclosure, the at least one maintenance action is determined based on a time until detection, wherein the time until detection is the time measured from the start of the predetermined measuring time period until the detection of the electrical signal or the change in the electrical signal. With reference to FIG. 8a, the time until detection corresponds to the time period between time point 0 and the time point of detection of the change in electrical signal 802. An assumption of the size of the leak can be made based on the length of the time until detection.

The diagram in FIG. 8b illustrates a change of resistance in kilo-Ohm [kOhm] over time in seconds [sec] that is measured between the probe and the reference element during a leakage test. The time point 0 again marks the start of the predetermined measuring time period and therefore coincides with the start of the leakage test. According to an aspect of the present disclosure, a signal threshold 812 may be determined. As illustrated in FIG. 8b, a baseline signal 811 is measured in the initial phase of the leakage test which is above the signal threshold 812. Once the electrical signal falls below the signal threshold 812, it is considered a "change in an electrical signal" and a leakage is determined. On the other hand, should the measured electrical signal, despite a certain signal variance, remain above the signal threshold 812 for the entire duration of the predetermined measuring time period, the fluidic system would be considered not leaking. In the example in FIG. 8b, the baseline signal 811 is recorded at approx. 530 kOhm. Leakage is detected after approx. 0.18 seconds, when the signal falls below the signal threshold 812, e.g., at 200 kOhm. The person skilled in the art will recognize that the signal threshold 812 may be determined based on the implemented detection method. Contrary to the example described above, it may be determined so that the baseline signal is below the signal threshold 812. Only when the electrical signal raises above the signal threshold 812, a leakage is determined. Alternatively, rather than determining an absolute value for the signal threshold 812, the signal threshold 812 may be determined as a relative value against the baseline signal 811. For example, the signal threshold 812 may be considered exceeded when a difference in capacitance is measured that is >100 pF from the baseline measurement 811 or when a difference in resistance is measured that is >100 kOhm from the baseline measurement 811.

In the preceding specification, devices and methods according to various aspects are described in detail. The devices and methods may be embodied in many different forms and should not be construed as limited to the aspects set forth and illustrated herein. It is therefore to be understood that the devices and methods are not to be limited to the specific aspects disclosed and that modifications and other aspects are intended to be included within the scope of the appended claims. Although specific terms are employed herein, they are used in a generic and descriptive sense only and not for purposes of limitation. Unless defined otherwise, all technical and scientific terms used herein have the same meaning as commonly understood by one skilled in the art to which the disclosure pertains. Although any methods and materials similar to or equivalent to those described herein can be used in the practice or testing of the methods, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one." Likewise, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. For example, the expressions "A has B," "A comprises B" and "A includes B" may refer both to a situation in which, besides B, no other element is present in A (i.e., a situation in which A solely and exclusively consists of B) or to a situation in which, besides B, one or more further elements are present in A, such as element C, elements C and D, or even further elements.

Also, reference throughout the specification to "one aspect", "an aspect", "one example" or "an example", means that a particular feature, structure or characteristic described in connection with the aspect or example is included in at least one aspect. Thus, appearances of the phrases "in one aspect", "in an aspect", "one example" or "an example", in various places throughout this specification are not necessarily all referring to the same aspect or example.

Furthermore, the particular features, structures, or characteristics may be combined in any suitable combinations and/or sub-combinations in one or more embodiments or examples.

What is claimed is:

1. An automated method of performing a leakage test of a fluidic system of an in-vitro diagnostic device comprising an electrically conductive probe fluidically connected to a fluid supply via a fluidic conduit and interacting electrically with a reference element, the method comprising:
    activating a pump to provide a fluid from the fluid supply into the probe;
    deactivating the pump;
    positioning the probe so that a tip of the probe is at a predetermined distance from a reference surface of the reference element;
    detecting an electrical signal or a change in an electrical signal between the probe and the reference element in a predetermined measuring time period;
    determining a leakage based on the detected electrical signal or the detected change in an electrical signal; and
    in response to determining the leakage, triggering at least one maintenance action.

2. The method according to claim 1, comprising having a valve that controls fluid passage between the pump and the probe in a closed state for the measuring time period.

3. The method according to claim 1, comprising switching a valve that controls fluid passage between the pump and the probe to an open state during the measuring time period.

4. The method according to claim 1, wherein the at least one maintenance action is selected from a set of possible conduit maintenance actions.

5. The method according to claim 1, comprising activating the pump during the measuring time period.

6. The method according to claim 5, wherein the at least one maintenance action is selected from a set of possible conduit and/or valve maintenance actions.

7. The method according to claim 1, wherein the at least one maintenance action is determined based on a time until detection, wherein the time until detection is the time measured from start of the predetermined measuring time period until the electrical signal or a change in the electrical signal is detected.

8. The method according to claim 1, wherein triggering the at least one maintenance action comprises generating an alert indicating the at least one maintenance action.

9. An in-vitro diagnostic device, comprising:
a fluidic system, comprising:
a fluid supply;
a pump;
an electrically conductive probe fluidically connected to the fluid supply via a fluidic conduit, and interacting electrically with a reference element; and
a controller configured to control the device to perform a leakage test of the fluidic system according to the method of claim 1.

10. The device according to claim 9, wherein the fluidic system further comprises a valve that controls fluid passage between the pump and the probe.

11. The device according to claim 9, wherein the electrically conductive probe is configured to detect a liquid level by determining contact with a liquid surface by any one or combination of measuring principles comprising capacitance, resistance, conductivity, induction measuring principle.

12. The device according to claim 9, wherein the probe is translatable and/or rotatable horizontally and translatable vertically with respect to the reference element or a liquid.

13. The device according to claim 9, wherein the device further comprising the fluidic system further comprises a valve that controls fluid passage between the pump and the probe, the valve is positioned at a level vertically lower than a level of the tip of the probe in a leakage determining position.

14. The device according to claim 9, further comprising an alert function configured to indicate leakage determination and the at least one maintenance action.

15. The device according to claim 9, wherein the controller is configured control the device to perform a leakage test of the fluidic system at a predefined time interval or in response to a trigger event or in response to an operator input.

16. An automated method of performing a leakage test of a fluidic system of an in-vitro diagnostic device comprising an electrically conductive probe fluidically connected to a fluid supply via a fluidic conduit and interacting electrically with a reference element, the method comprising:
activating a pump to provide a fluid from the fluid supply into the probe;
deactivating the pump;
positioning the probe so that a tip of the probe is at a predetermined distance from a reference surface of the reference element;
detecting an electrical signal or a change in an electrical signal between the probe and the reference element in a predetermined measuring time period;
determining a leakage based on the detected electrical signal or the detected change in an electrical signal; and
in response to determining the leakage, triggering at least one maintenance action, the at least one maintenance action being determined based on a time until detection, wherein the time until detection is the time measured from start of the predetermined measuring time period until the electrical signal or a change in the electrical signal is detected.

* * * * *